No. 813,404. PATENTED FEB. 27, 1906.
D. S. COOK.
PROCESS FOR REMOVING ROUGH AND IRREGULAR FOREIGN SEEDS
FROM CLOVER AND OTHER SMOOTH SEEDS.
APPLICATION FILED JULY 19, 1905.
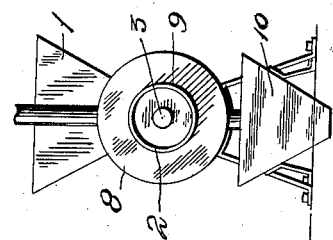
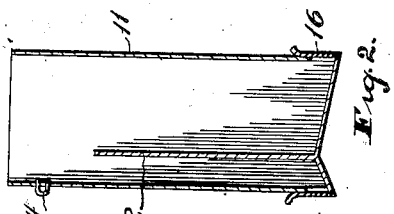
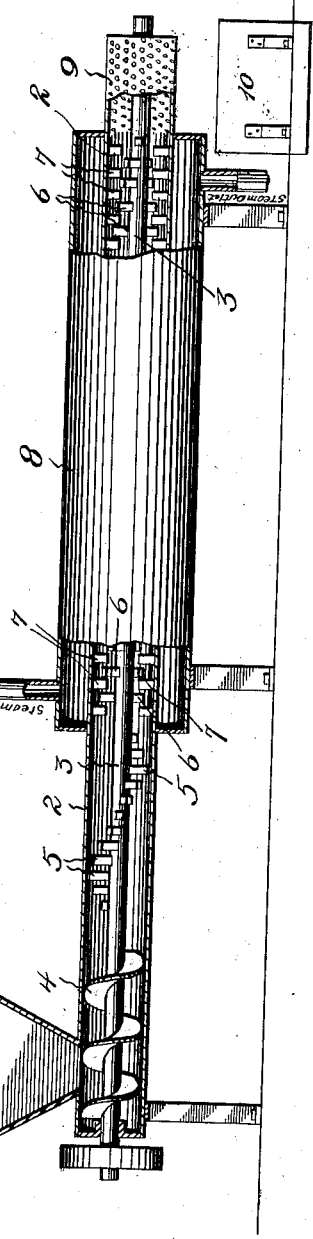
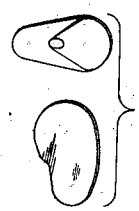
WITNESSES:
Carl Stoughton
INVENTOR
David S. Cook,
BY
ATTORNEYS

UNITED STATES PATENT OFFICE.

DAVID S. COOK, OF BASIL, OHIO, ASSIGNOR OF ONE-THIRD TO JOSEPH W. McCORD AND ONE-THIRD TO WILLIAM S. COOK, OF COLUMBUS, OHIO.

PROCESS FOR REMOVING ROUGH AND IRREGULAR FOREIGN SEEDS FROM CLOVER AND OTHER SMOOTH SEEDS.

No. 813,404.     Specification of Letters Patent.     Patented Feb. 27, 1906.

Application filed July 19, 1905. Serial No. 270,312.

*To all whom it may concern:*

Be it known that I, DAVID S. COOK, a citizen of the United States, residing at Basil, in the county of Fairfield and State of Ohio, have invented certain new and useful Improvements in Processes for Removing Rough and Irregular Foreign Seeds from Clover and other Smooth Seeds, of which the following is a specification.

This invention relates to a new and useful process for removing rough and irregular foreign seeds from clover and other smooth seeds.

It is a well-known fact that seeds coming from a huller embody many rough and irregular seeds as well as clover and smooth seeds. These rough and irregular seeds are detrimental to the quality of the product and are difficult to remove. In fact, heretofore it has been almost impossible to separate the objectionable seeds from the desirable seeds, as they are both of practically the same size and weight. The most common foreign seed encountered is the "buckhorn." This seed is oval in outline, rounded at its ends, and on one side and on its other side is hollowed or grooved.

The process consists first in mixing the seeds with a paste preferably composed of some readily-drying adhesive material in which is incorporated a suitable heavy material to increase the specific gravity of the paste. The paste being mixed with the seeds readily fills the grooved or hollowed portions of the buckhorn-seeds or any irregularities or concavities on the surfaces of the foreign seeds. The second step of the process consists in drying the mass of mingled seeds and paste, the character and duration of which depending upon the paste employed. The third step contemplates a suitable agitation of the seeds, whereby the paste is removed from the surfaces of the smooth seeds and the smooth portions of the surfaces of the irregular or foreign seeds, the paste deposited in the hollowed or grooved portions, however, being undisturbed. The smooth seeds are thus cleaned and highly polished and will be lighter than the foreign seeds, each of which contain a deposit of the heavy paste, the specific gravity of the buckhorn or foreign seeds thus being greater than the clover-seeds. The seeds are now ready to be separated, which constitutes the fourth step of the process. The separation may be accomplished in various manners and will depend somewhat on the character of paste used. For instance, if the paste includes lead-dust or other heavy material combined with a small proportion of flour and water or other adhesive material the weight of the buckhorn-seed will be increased to such an extent that it could be easily separated on a suitable seed-mill, or if the paste was made from iron filings or dust mixed as above the separation could be effected by allowing the seeds to pass over a series of magnets, to which the buckhorn-seeds, with the iron paste in their grooves, would cling and could be cleaned off from time to time by suitable means.

Various manners of removing the buckhorn-seeds by magnetic attraction could be employed, and it has been found that a simple way of accomplishing the result is to allow the seeds to fall or pass through a magnetic field, which causes the buckhorn-seeds owing to their metallic deposits to be deflected and fall into a separate compartment, thus being separated from the clover-seeds, which are allowed to fall into another compartment or receptacle.

In order to more clearly present the process, an apparatus by which the process may be carried out has been illustrated in the annexed drawings, in which—

Figure 1 is a side elevation of the apparatus. Fig. 2 is an end elevation. Fig. 3 is a detailed view showing the grooved side of a buckhorn seed and a cross-section of the same, and Fig. 4 is a detailed view showing a side elevation and an end elevation of a clover-seed.

In carrying out the process in connection with the apparatus illustrated in the drawings the seeds and suitably-mixed paste are fed through a hopper into an elongated cylinder or tube 2. A shaft 3, extending longitudinally of the cylinder and suitably revolved, has mounted on its portion adjacent the hopper a short spiral conveyer 3, which feeds the seeds and paste along the cylinder, so that they are encountered by a plurality of short lugs 5, arranged in spiral form on the shaft 3. The lugs 5 tend to mix the paste and seeds and gradually force them through the tube, so that the mixture is next encountered by short lugs 6, mounted in spiral form on the shaft 3 and passing between short lugs 7, projecting inwardly from the cylinder. As the mixture is gradually forced along the lugs 6 in revolving will pass close to the lugs 7, thus thoroughly mixing the paste and seeds and forcing the paste into the hollowed or grooved portions of the buckhorn-seeds. This section of the tube is surrounded by a steam-jacket 8, to which steam is suitably admitted and exhausted. As the seeds are gradually forced along the tube by and between the lugs the steam-jacket acts to dry the paste, and the lugs will remove the surplus dry paste, polishing the seeds and leaving the paste only in the grooves or cavities of the buckhorn-seeds. At the extreme end of the cylinder a perforated portion 9 is provided into which the seeds are delivered by the spirally-arranged lugs 6. Three steps of the process have now been completed. These steps specifically enumerated are, first, mixing of the seeds with the paste; second, the drying of the seeds; third, the removing of the surplus paste and polishing of the seeds.

The fourth and last step of the process is now carried out. The polished and cleaned smooth seeds, together with the buckhorn-seeds, with their grooved portions filled with the metallic paste, fall from the perforated portion 9 of the cylinder into a hopper 10, suitably supported therebeneath and arranged over a receptacle 11. The hopper is preferably placed over the center of the receptacle, so that a vertical partition 12, placed at one side of the receptacle, stands out of line or path of the falling seeds. Along the side nearest to the partition 12 a plurality of suitably constructed and operated magnets 14 are arranged. The seeds falling from the hopper pass the magnets, which will attract the buckhorn-seeds, owing to the metallic substance contained in the grooves of the same, and deflect these seeds so that they will fall over the partition 12, and thus be separated from the clover or smooth seeds, which will fall straight into the receptacle, as will be evident. At the bottom of the receptacle suitable doors 15 and 16 are shown, by which the seeds may be removed from the receptacle from time to time.

It is to be understood that the process may be carried out in various ways and that the apparatus herein shown is merely one of the many constructions by which the desired result may be obtained.

Having now fully described my invention, what I claim, and desire to secure by Letters Patent, is—

1. A process for separating irregular and other foreign seeds from clover and other smooth seeds, consisting in depositing a heavy material in the concavities of the foreign seeds, and separating the seeds containing the deposits of heavy material from the other seeds by suitable means.

2. A process for separating irregular and other foreign seeds from clover and other smooth seeds, consisting in first mixing the seeds with an adhesive paste containing a heavy material, second, drying the mixture, third, removing the superfluous portions of the paste which has been dried without disturbing the paste deposited in the concavities of the foreign seeds, and fourth, separating the foreign seeds containing the paste deposits from the other seeds by suitable means.

3. A process for separating irregular and other foreign seeds from clover and other smooth seeds, consisting in depositing a metallic material in the concavities of the foreign seeds and then separating the foreign seeds from the other seeds by magnetic attraction.

4. A process for separating irregular and other foreign seeds from clover and other smooth seeds, consisting in first mixing the seeds with a paste having metallic properties so that the concavities of the foreign seeds are filled by the said paste, second, drying the mixture, third, removing the surplus paste which has been dried and polishing the seeds leaving the paste only in the grooves or concavities of the foreign seeds, and fourth, separating the seeds having the metallic paste deposits from the other seeds by magnetic attraction.

In testimony whereof I affix my signature in presence of two witnesses.

DAVID S. COOK.

Witnesses:
 A. L. PHELPS,
 M. B. SCHLEY.